(12) United States Patent
Wilson et al.

(10) Patent No.: US 8,250,099 B2
(45) Date of Patent: Aug. 21, 2012

(54) DATA PROVISIONING REGISTRY

(75) Inventors: Richard M. Wilson, Charlotte, NC (US); Eric B. Stanley, Charlotte, NC (US); Charles B. Lomax, Jr., Monroe, NC (US); Benjamin Alexander Leeson, Charlotte, NC (US); Mary Carla DeAngelis, Jacksonville, FL (US)

(73) Assignee: Bank of America Corporation, Charlotte, NC (US)

( * ) Notice: Subject to any disclaimer, the term of this patent is extended or adjusted under 35 U.S.C. 154(b) by 245 days.

(21) Appl. No.: 12/413,125

(22) Filed: Mar. 27, 2009

(65) Prior Publication Data

US 2010/0145999 A1    Jun. 10, 2010

Related U.S. Application Data

(60) Provisional application No. 61/121,046, filed on Dec. 9, 2008, provisional application No. 61/120,685, filed on Dec. 8, 2008, provisional application No. 61/120,621, filed on Dec. 8, 2008.

(51) Int. Cl.
*G06F 17/03* (2012.01)

(52) U.S. Cl. ...................................................... 707/791

(58) Field of Classification Search ........................ None
See application file for complete search history.

(56) References Cited

U.S. PATENT DOCUMENTS

| 7,246,104 | B2 * | 7/2007 | Stickler |
| 2003/0050849 | A1 * | 3/2003 | Keller et al. |
| 2003/0149934 | A1 * | 8/2003 | Worden |
| 2008/0059517 | A1 * | 3/2008 | Glamia et al. |

OTHER PUBLICATIONS

Sheehan, Jack, "Data Provisioning Using Authoritative Data Sources", NDIA SBA Conference, May 16, 2001.
GB Search Report dated Mar. 23, 2010 for GB Application No. GB0920476.9.

* cited by examiner

*Primary Examiner* — Rehana Perveen
*Assistant Examiner* — Masoud S Hakami
(74) *Attorney, Agent, or Firm* — Michael A. Springs; Moore & Van Allen PLLC; Patrick B. Horne

(57) ABSTRACT

A registry for designating authoritative sourcing of data from a data environment in a computer readable storage medium. Selected data content resides into a first data subject area in the form of a common business language, and metadata including characteristics of data stores in the data environment resides into a second data subject area, which is a metadata repository. Data linking a term in the first data subject area with an authoritative location of data associated with the term, as identified in the second data subject area, resides into a third subject area, which is the registry. A basis of authority of the data location and operating scope of the data may be designated in the third data store. Operating scopes may be functional, geographic, temporal, organizational, or a combination thereof. A computer program product and computer readable memory system for designating authoritative sourcing in a data environment are provided.

22 Claims, 4 Drawing Sheets

DATA PROVISIONING REGISTRY

RELATED APPLICATIONS

This application claims the benefit of co-pending U.S. Patent Application No. 61/121,046, entitled "Data Provisioning Registry," filed on Dec. 9, 2008, U.S. Patent Application No. 61/120,621, entitled "System and Method for Maintaining an Updated Information Inventory," filed Dec. 8, 2008, and U.S. Patent Application No. 61/120,685, entitled "Data Environment Change Notification," filed Dec. 8, 2008, all sharing one or more common inventors herewith, and the entire contents of all of which are incorporated herein by reference.

BACKGROUND

Institutions may manage multiple data stores that include specific information about, for example, functions, products, applications, facilities, customers, or processes within the entity. The institutions may desire to identify centrally the location, structure and operating characteristics of these data stores in order to facilitate effective data management, governance, and retrieval.

A data store is a container in which digital information is gathered and/or maintained. The information in the data store may be structured or unstructured. A data store is not necessarily a Relational Database Management System (RDBMS), although this is one of the most common types of data store. It may take the form, for example, of a structured file system or hierarchical database. Moreover, a data store is not an application. Applications represent a use of information to fulfill a particular function. Many applications do maintain a set of data of concern only within the application's domain, but applications generally do not have a one-to-one relationship to individual data stores, especially in the case of shared information.

Metadata is data that provides information about other data. It is used to facilitate the understanding, use and management of data by characterizing data resources and data sets to make them understandable, relevant, findable, and controlled. Institutions with significant data stores may use metadata management products that permit definition of a common business language and describe a technical environment of data stores, including content and structure. A common business language is a standard set of reference terms with defined meanings used to describe the business processes and related data of an organization. A common business language may enable effective sharing of data across a large organization, and may be stored in a dictionary in a data store. In a complex system environment, however, multiple sources exist for the "same" data and users of these information sources, and direction may be lacking on which instance or version of the data ought to be used, and which instances should be deprecated.

SUMMARY

In accordance with one embodiment, a method of designating authoritative sourcing of data in a data environment stored in a computer readable storage medium is provided. The method includes receiving into a first data subject area selected data content in the form of a common business language including associated terms. Metadata including characteristics of data stores in the data environment are received into a second data subject area, and data linking a specified term in the first subject area with a location identified in the second data subject area, where the identified location is an authoritative location for data defined by the specified term, are received into a third data subject area.

In accordance with another embodiment, an apparatus for designating authoritative sourcing of data in a data environment stored in a computer readable storage medium is provided. The apparatus includes means for receiving into a first data subject area selected data content in the form of a common business language including associated terms and means for receiving into a second data subject area metadata including characteristics of data stores in the data environment. The apparatus further includes means for receiving into a third data subject area data linking a specified term in the first subject area with a location identified in the second data subject area, wherein the identified location is an authoritative location for data defined by the specified term.

In accordance with another embodiment, a computer readable memory system encoded with a data structure for designating authoritative sourcing of data in a data environment is provided. The data structure includes first, second, and third data subject areas. A common business language resides in the first data subject area. A technical metadata repository resides in the second data subject area, in which the repository stores metadata including characteristics of data stores in the data environment. A data registry resides in the third data subject area. The data registry includes data linking a specified term in the first subject area with a location identified in the second data subject area, wherein the identified location serves as a basis of authority for data defined by the specified term.

In accordance with another embodiment, a method of using a data registry stored in a computer readable storage medium operatively connected to a processor to obtain direction on appropriate data sourcing from a data environment is provided. The method includes the processor identifying a type of data of interest as described by a common business language and as stored in a common business language data subject area, the processor determining if the data registry includes information on the type of data of interest, and the processor obtaining a location identified in the second data subject area with a specified term in the first subject area, wherein the identified location is an authoritative location for data defined by the specified term.

In accordance with another embodiment, a computer program product for designating authoritative sourcing of data in a data environment is provided, where the computer program product includes a computer readable storage medium having a computer program stored therein. The computer program includes instructions allowing receipt of selected data content in the form of a common business language including associated terms into a first data subject area, and instructions allowing receipt of metadata including characteristics of data stores in the data environment into a second data subject area. The computer program further includes instructions allowing receipt of data linking a specified term in the first subject area with a location identified in the second data subject area, where the identified location is an authoritative location for data defined by the specified term, into a third data subject area.

In accordance with another embodiment, an apparatus configured to designate authoritative sourcing of data in a data environment is provided. The apparatus includes a computer readable storage medium including computer readable program code stored therein and a processor operatively coupled to the computer readable storage medium. The processor is configured to execute the computer readable program code to store selected data content in the form of a common business language including associated terms in a first data subject area and to store metadata including characteristics of data stores in the data environment in a second data subject area. The processor is further configured to store data linking a specified term in the first subject area with a location identified in the second data subject area, where the identified location is an authoritative location for data defined by the specified term, in a third data subject area.

The features, functions, and advantages can be achieved independently in various embodiments or may be combined in yet other embodiments.

BRIEF DESCRIPTION OF THE DRAWINGS

For a more complete understanding, reference should now be had to the embodiments shown in the accompanying drawings and described below. In the drawings.

DETAILED DESCRIPTION

The following detailed description refers to the accompanying drawings, which illustrate specific embodiments. Other embodiments having different structures and operations do not depart from the scope of the claims appended hereto. It should also be understood that not every feature of the systems and methods described is necessary to implement the embodiments in any particular one of the appended claims. Throughout this disclosure, where a process or method is shown or described, the steps of the method may be performed in any order or simultaneously, unless it is clear from the context that one step depends on another being performed first. Also, time lags between steps can vary.

Institutions may manage multiple data stores that include specific information about, for example, functions, products, applications, facilities, customers, or processes within the entity. The institutions may desire to identify centrally what data resides in the data stores in order to provide data management, governance, and retrieval. Large volumes of data make it practical to track descriptive information about the data and data stores, rather than manage the environment on an ad hoc basis, and such descriptive data may be referred to as metadata. Metadata may be stored in a technical metadata repository.

"Data provisioning" may include a planned approach for packaging shared information assets to meet specific needs for distribution and consumption across a business environment. Provisioning may address the consistent creation, access, maintenance, storage, archival and disposal of information assets and identify clear accountability for these tasks. Data provisioning may reduce redundant data management activities and storage, along with the effort required to keep data synchronized and collect data once the data is in a designated system that creates and manages it. Provisioning may then permit sharing of the data with all stakeholders and consumers of the data through a controlled approach to distribution.

Figure 1:
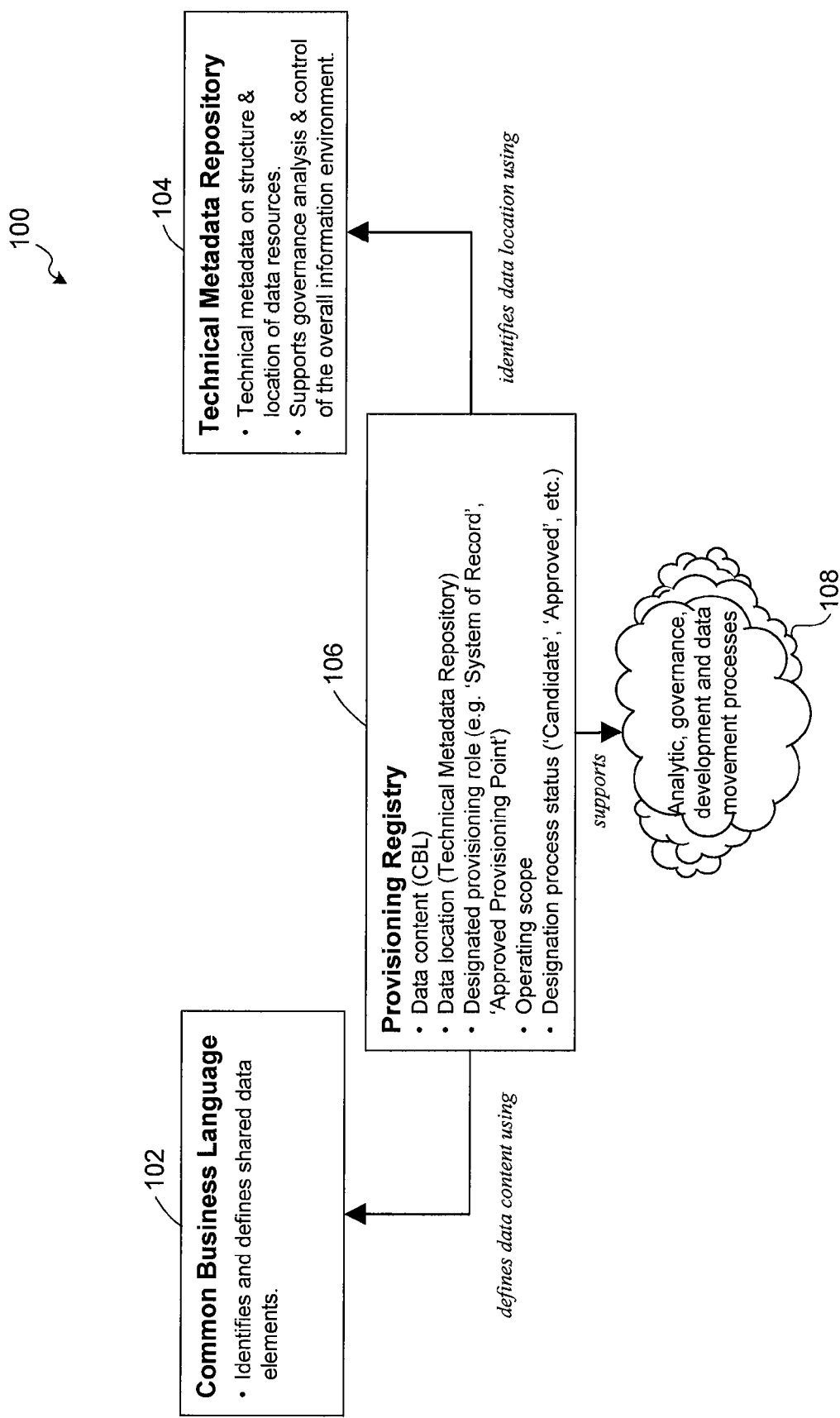
FIG. 1 is a block diagram illustrating an embodiment of a system for designating authoritative data sourcing in a data environment.

Turning now to the drawings, FIG. 1 shows an embodiment of a data provisioning registry system 100 including a common business language 102, a technical metadata repository 104, and a data provisioning registry 106. The common business language 102, technical metadata repository 104, and data provisioning registry 106 are data subject areas that may exist as distinct parts of a single data store, or as separate data stores that reside on different hardware servers. The data provisioning registry ("the registry") 106 may designate information systems with a role in the authoritative sourcing and distribution of shared data elements. The registry 106 may reference, and work in concert with, the common business language 102, which defines the meaning of the data, and the technical metadata repository 104 that characterizes the structure, location, and operating characteristics of data stores within an environment. The technical metadata repository 104 may act as the standard repository for facts about data stores and data lineage, and may support governance analysis and control of the overall information environment.

The metadata repository 104 may store the history of technical, operational, and business metadata across platforms, projects, and organizations. Stored information may include levels of detail such as a system level, a data store level, table level, and field level. Further description of an information management inventory is documented in commonly assigned U.S. patent application Ser. No. 12/413,116, entitled "Information Management Inventory," filed on concurrent date herewith, and U.S. patent application Ser. No. 12/413,122, entitled "Data Environment Change Notification" filed on concurrent date herewith, the entire contents of all of which are incorporated herein by reference.

The registry 106 links by reference a description of data content in accordance with the common business language 102 and an authoritative location, as identified in the metadata repository 104, of data of interest corresponding to the data content description. The registry 106 may supplement the existing technical and business metadata with governance metadata, providing a view of the "right" place to access data, with governance occurring through a set of activities that establish formal control of decisions with respect to management of data. Data stores that are inappropriate or unwanted sources of data may be deprecated to designate them as such. The registry 106 may identify the proper use of a location of data as a source for obtaining relevant information in a defined business language subject area, and the possible limitations of the data in that location with respect to its operating scope. The registry 106 may drive decisions by analysts and systems developers. The registry 106 may also be connected to data movement services for an environment to limit the ability to download data from deprecated sources, either on an automated basis (using extraction, transforming, and loading tools) or manual basis. The registry 106 may be designed to support a corporate data provisioning strategy, and may support other strategies for consistent data movement, information protection and security, and other processes.

Several factors that may be included in a registry 106 include a description of the data content, which is in the common business language 102. For example, "customer" may be data content. The data location for the data content "customer," which may be gained from the technical metadata repository 104, may be included, and may reflect, for example, a certain database on a certain server, in a particular table, and having an identified field name. A designated provisioning role may be input, categorizing the source of the data based on the type of system, which could be "system of record," "system of collection," or "approved provisioning point" as discussed further below. The "role" is the basis of authority of the data location. An operating scope for the data may be set forth, such as functional, geographic, temporal, organizational, or other limitations that are germane to the data. A designation process status may be identified, for example, where a particular location of data that is proposed by a governance team to be authoritative is first called a "candidate," is subsequently changed to "approved." The registry 106 may act to support analytic, governance, development, and data movement processes 108.

There may be a set of data elements in the common business language 102 that serve as shared information resources across organizational, process, or program boundaries, which may be referred to as enterprise or shared data elements. Shared data elements require clear agreement on their meaning, as well as standards that establish their appropriate management, quality, and usage. Therefore, they may be subject to more stringent control than local or unshared data. Examples of uses of shared, enterprise data in a financial institution are internal or external reporting, regulatory compliance reporting, and cross-product business processes such as economic modeling, risk management, referrals, sales, and executive business scorecards.

The registry 106 may be part of a larger metadata management strategy, and in itself may not provide a full-featured inventory of all systems and data lineage at the institution. In modeling terms, the registry may act as an associative table between a location for data, which is in an information system known to the metadata repository 104, and some specific data content, which is something known from the common business language. The associative table may embody the details about a provisioning role that the location plays with respect to that data content. A provisioning role for an authoritative location of certain data content may be designated in the registry 106, and may include designations such as "system of record," "system of collection," or "approved provisioning point."

A "system of record" may be an information system that acts as the authoritative repository accountable for active management (create, update, and delete activities) of a specific set of data elements and relationships at one or more specified stages in their lifecycle. The designation of a system of record generally reflects the fact that it the data store contains the most accurate and complete values for these data elements, or it is the only place where the data are available. Because systems of record may tend to be structured for specific real-time data maintenance and processing tasks, they may be associated with a real-time/near real-time approved provisioning point (discussed below) to provide timely access for related operational needs without degrading system of record system performance.

A "system of collection" may be an information system that acts as an authoritative repository accountable to aggregate, rationalize against a standard model, and maintain some level of history for a specific set of data elements and relationships. A system of collection may acquire its data from one or more systems of record, and is designated because it has the most complete, accurate and up-to-date values for these elements. Because systems of collection may be structured to include a wide scope of data and manage potentially large historical data sets, they may often be associated with one or more approved provisioning points to provide views of their content structured for distribution to analytical data consumers, with data consumers being those who are users of or are otherwise interested in data.

An "approved provision point" may be an information system that acts as an authoritative repository accountable to provide managed access to specified data elements and relationships that require distribution to multiple data consumers, who may be, for example, operational or analytic. Approved provisioning points may be specifically structured for the purpose of distribution and may be able to certify that they accurately present the data from the system of record or system of collection with which they are associated. Approved provisioning points may often be structured in a denormalized mode to optimize fast access. In contrast to a system of collection, which is intended to manage a fully scoped picture of a given domain, an approved provisioning point may tend to be crafted to service the needs of one or more specific downstream data consumers and as such has an identifiable operating scope in terms of the historical depth, level of detail, function, geography, and/or organizational breadth. An approved provisioning point may be, for example, an authorized copy of a system of record or system of collection.

Any of the roles designated for data stores to be a system of record, a system of collection, or an approved provisioning point may be considered to be an "approved authority" for the system, meaning that an identified data store is the authoritative source for the data of interest and that a data consumer may safely get data from the referenced location.

Figure 2:
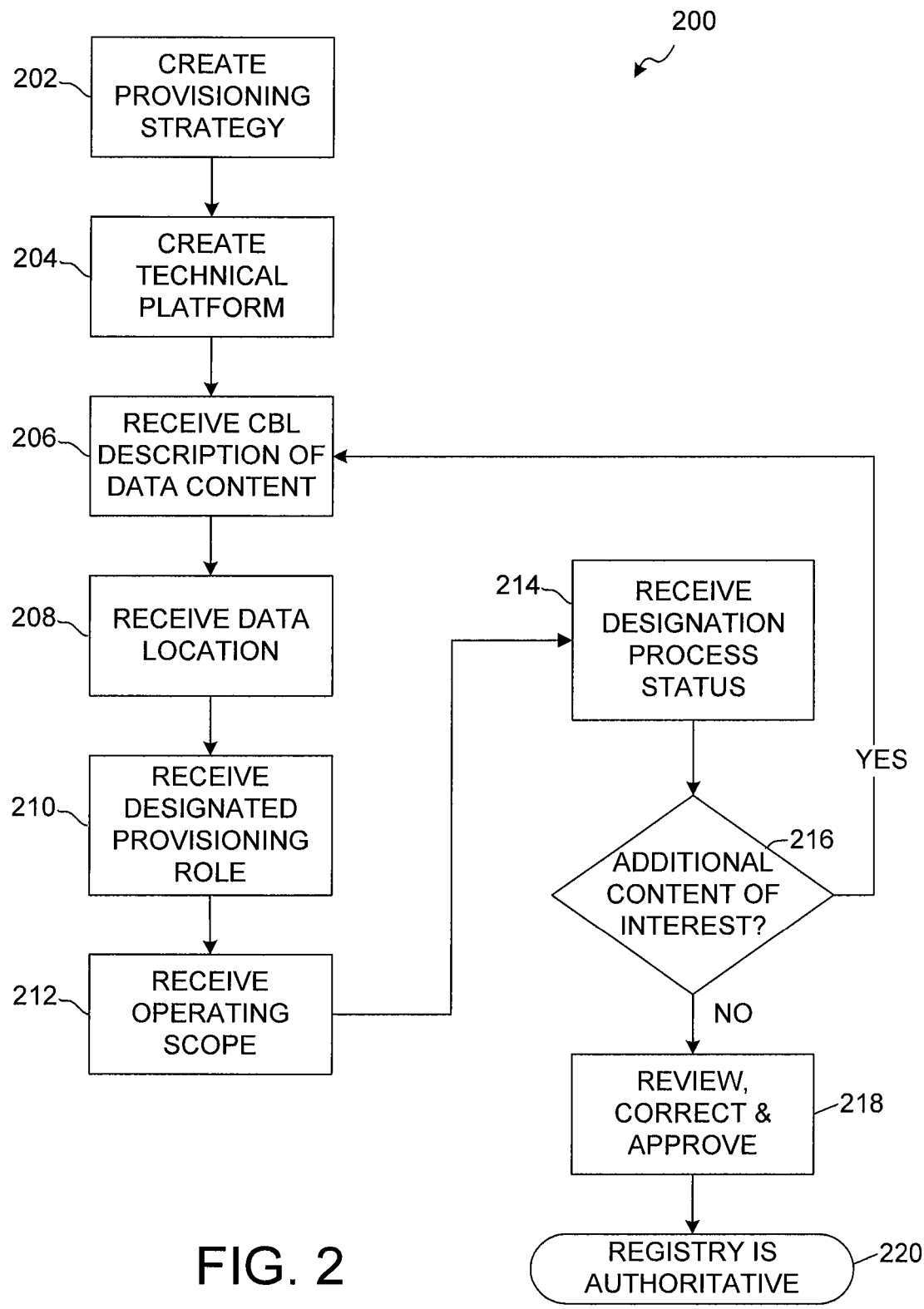
FIG. 2 is a flowchart illustrating a method of designating authoritative data sourcing in a data environment in accordance the system of FIG. 1.

FIG. 2 shows an embodiment of a method of creating a data provisioning registry 200. The process may begin by the institution creating a provisioning strategy 202, which may include identifying what information is of interest to potential data consumers, who may be, for example, end users or parties otherwise interested in data, what candidate systems of record and collection there are, and what are limitations of particular interest to the organization based on geographic, temporal, cross-functional activities, and so forth. A technical platform may be created 204 for the registry 106; at a most basic level this may be a CPU and a database, with supporting software as may be used to establish and manage the database. Then the process proceeds with data entry and corresponding receipt in data subject areas, which may be through a system interface with the common business language 102 and the technical metadata repository 104, or may be done manually. The common business language (CBL) 102 description of the data content that is of interest in the registry 106 may be received 206 by the registry data subject area, and the corresponding location of that actual data in the overall data environment may be received 208 by the registry data subject area. The common business language content may be established with the assistance of software such as IBM Business Glossary. ASG-Rochade software is an example of one metadata management tool that may be useful for metadata repository management. Oracle is an example of one platform that may be useful for working with a registry data store. The location may be selected from the technical metadata repository 104, and this is intended to be an authoritative location of data to which any data consumer will be directed. The basis for the location being authoritative is received into the registry 106 as the designated provisioning role 210.

The operating scope for the data may be received 212 by the registry data subject area, indicating the limitations of the data, which may be helpful, for example, if a data consumer is looking for information in a certain geographic region, as one might do if trying to identify customers or accounts central to one office, or perhaps reports from a past month. The designation process status may be received 214. This status is the whether the location is still a candidate to be an authoritative source or has been approved as one by a data governance entity within the organization.

If there is additional content of interest 216 that has not been received into the registry 106, additional data content descriptions may be received in common business language 206, and the process may repeat. Then one or more groups in the institution may review, correct, and approve 218 the locations, and the registry overall, and the registry is authoritative 220.

Figure 3:
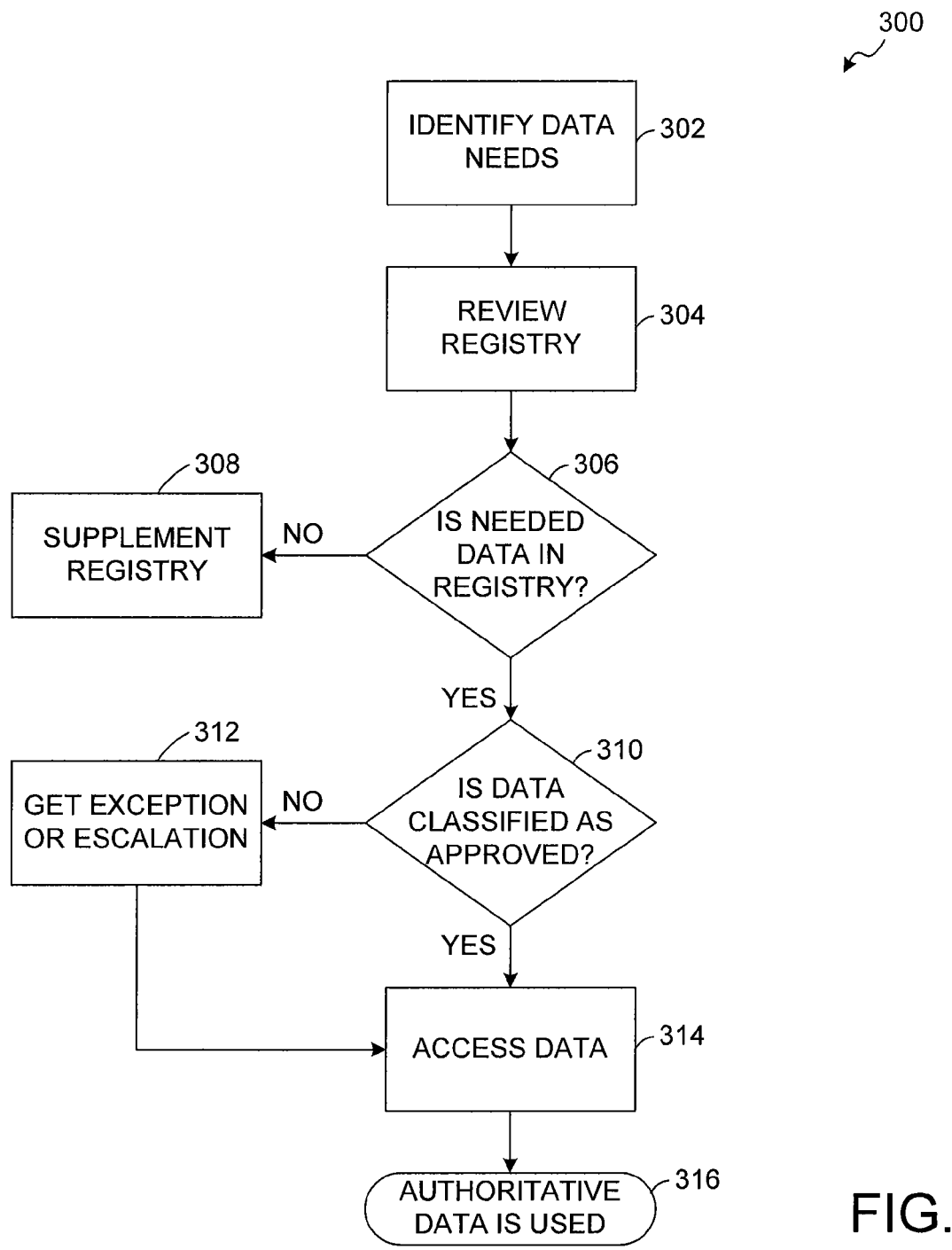
FIG. 3 is a flowchart illustrating a method of using a data registry to obtain direction on appropriate data sourcing from a data environment in accordance with the system of FIG. 1.

A prospective data consumer, or user, sees the registry from another perspective. FIG. 3 shows an embodiment of a method of using the registry 300. First, the user identifies his or her data needs 302 and reviews the registry 304 with respect to the common business language. If the data content of the registry 106 does not include the data of interest 306 to the user, the user may seek to have the registry supplemented 308, using the process 200 of FIG. 2. If the data of interest is included in the registry, then the question is asked to identify if the data location is approved as authoritative 310, and in addition whether the operating scope of this authoritative role matches the scope of interest to the data consumer. If the data location is not approved as authoritative, the user must either get, in block 312, an exception to prohibition against use from a governance entity, or seek to have the classification of the status escalated to "approved." Once the location of the data of interest is approved as authoritative or an exception is granted, the user may access the data 314 and use it 316.

Figure 4:
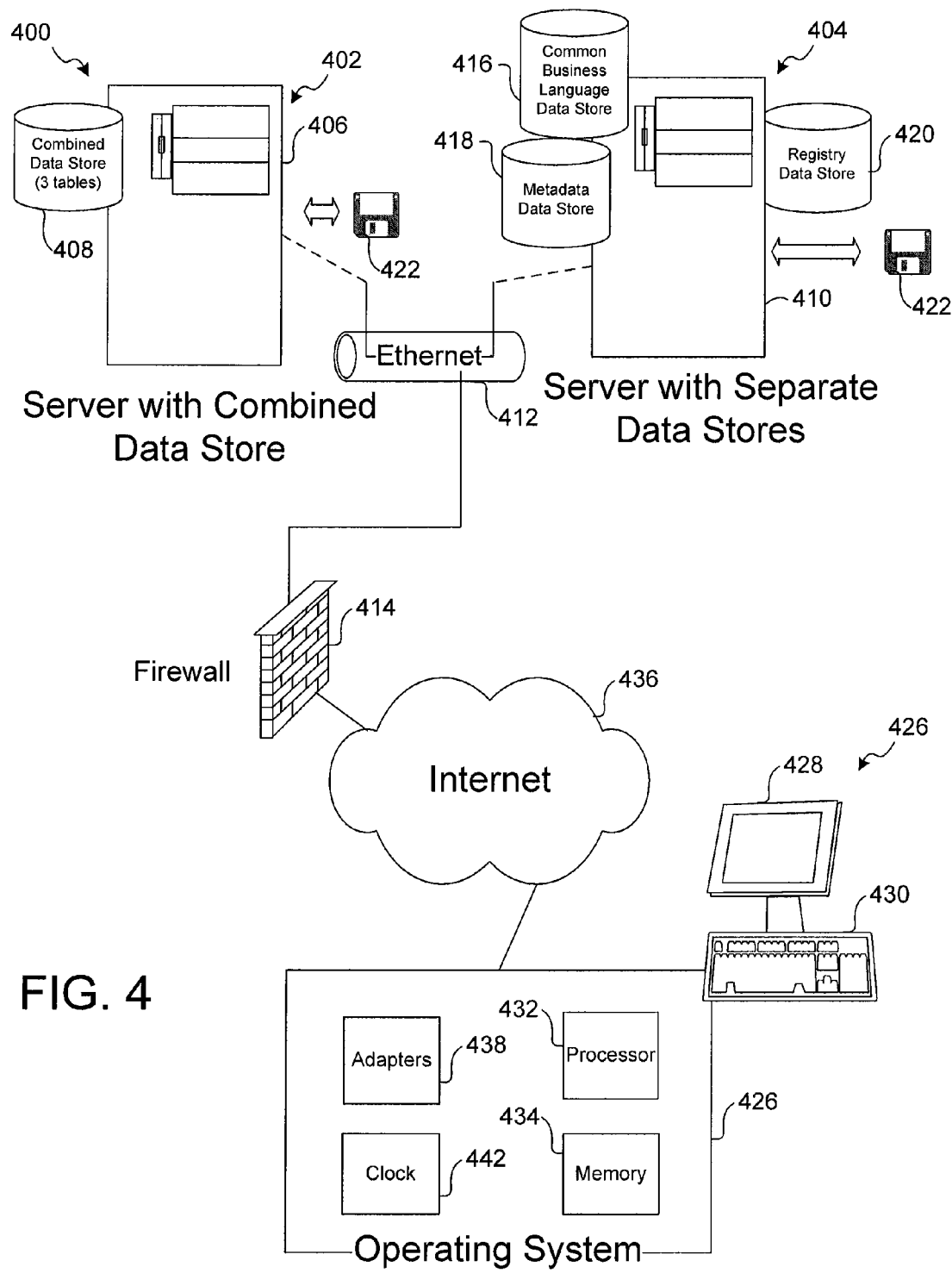
FIG. 4 is a system block diagram according to a sample embodiment.

Turning to FIG. 4, a network block diagram showing the systems 400 involved in implementing an example embodiment is shown. Two alternative embodiments are shown: one embodiment 402 being a server with a combined data store, and another embodiment 404 including a server with three separate data stores. The first embodiment 402 includes a server 406 and one combined data store 408. The combined data store 408 includes three discrete groups of data that are data subject areas with the data store 408, which may be the common business language data, the metadata repository, and the data provisioning registry. These three data subject areas may be, for example, three tables within the combined data store 408. The second embodiment 404 shown reflects three separate data subject area on a server 410 that are the common business language data store 416, the metadata repository data store 418, and the data provisioning registry data store 420.

The servers 402, 404 may be connected to an internal network via an Ethernet local area network (LAN) 412. Connections to each server 406, 410 are shown in dashed line to indicate that the embodiments 402, 404 are alternatives to each other; connection of both servers 406, 410 is not intended, though possible. As is the case with most businesses, these resources may be located behind an Internet firewall 414. The server with a combined data store 402 and the server with separate data stores 404 are shown in this example as implemented on single hardware platforms; however, they could just as easily be implemented on a multiple platforms. For example, the three separate data subject areas may reside on two or three different servers.

Still referring to FIG. 4, computer program instructions to implement the various functions of embodiments described herein reside partly in memory of registry server 408 when it is in operation. Such instructions may include software for establishing and maintaining databases. When the system is not in operation, the instructions typically reside on a fixed magnetic disk (not shown). The computer program instructions may also be stored on portable media such as a CD-ROM, tape cartridge, or removable magnetic disk, as conceptually illustrated by disc 422.

The software and hardware components of embodiments described herein can be implemented using a variety of combinations of system elements commonly used for software engineering and systems development. The main components of significance include the choice of a Database Management System (and an associated query language) housing the common business language, the metadata data store, the registry, network protocols and connectivity for integration with other systems, and an underlying operating system and hardware platform for the system as a whole. Tools an implementer might choose from include IBM Infosphere Server (IIS) and AGS-Rochade.

Typically, choices of these elements are guided by cost, connectivity, and scalability considerations as well as technical standards adopted by the development group or company in question. A set of complementary choices should be made to meet the technical requirements of the target environment. For example, some implementers may focus on minimal cost, and result in a platform based on inexpensive commodity-based Intel-based processors, a Linux operating system, a Java development environment, and Open Source software solutions for software development tools (e.g. Eclipse), database management systems and the like. Other implementers may opt to build any or all of the software components based on commercial software products provided by Microsoft Corporation as a way to achieve standards compliance or out-of-the-box interoperability. Large scale, high availability or high performance solutions may require more specialized components, matched to support more stringent business and system requirements.

In any case, a computer program which implements all or parts of the embodiments described herein through the use of systems like those illustrated in FIG. 4 can take the form of a computer program product, including executable code, residing on a computer usable or computer readable storage medium. Such a computer program can be an entire application to perform all of the tasks necessary, or it can be a macro or plug-in which works with an existing general purpose application such as a spreadsheet or database program. A tangible medium may be used, but note, however, that the "medium" may also be a stream of information being retrieved when a processing platform or execution system downloads the computer program instructions through the Internet or any other type of network. Computer program instructions which implement the embodiments described herein can reside on or in any medium that can contain, store, communicate, propagate or transport the program for use by or in connection with any instruction execution system, apparatus, or device. Such a medium may be, for example, but is not limited to, an electronic, magnetic, optical, electromagnetic, or semiconductor system, apparatus, device, or network.

A computer system 426 of a functional team of the institution is represented by a conceptual block diagram in FIG. 4. Such a client system is typically connected to peripherals such as display 428 and keyboard 430. The processing platform includes one or more processors 432, and a certain amount of memory 434. The functional team's computer system accesses the institution's servers via the Internet 436, or alternatively a secure LAN, wide area network (WAN), or other network internal to the institution. The common business language 102 description of the data content that is of interest in the registry 106, the location of that data in the overall environment, a designated provisioning role, an operating scope, a designation process status, or a combination thereof may be received 206, 208, 210, 212, 214 by the computer system 426, the Internet or other network 436, the Ethernet 412, one of the servers 402, 404, and the applicable data subject area 408, 416, 418, 420. Information can be gathered on installed adapters 438, the operating system 426, and characteristics of the system clock 442.

The flowcharts and block diagrams in the figures illustrate the architecture, functionality, and operation of possible implementations of systems, methods and computer program products according to various embodiments. In this regard, each block in the flowchart or block diagrams may represent a module, segment, action, or portion of code, which comprises one or more executable instructions or actions for implementing the specified logical function(s). It should also be noted that, in some alternative implementations, the functions noted described herein may occur out of the order presented, depending upon the functionality involved. It will also be noted that each block of the block diagrams and/or flowchart illustrations, and combinations of blocks in the block diagrams and/or flowchart illustrations, can be implemented by special purpose hardware-based systems or operators which perform the specified functions or acts.

The terminology used herein is for the purpose of describing particular embodiments only and is not intended to be limiting. As used herein, the singular forms "a", "an" and "the" are intended to include the plural forms as well, unless the context clearly indicates otherwise. Additionally, comparative, quantitative terms such as "above", "below", "less", "greater", are intended to encompass the concept of equality, thus, "less" can mean not only "less" in the strictest mathematical sense, but also, "less than or equal to."

Embodiments of a data provisioning registry may allow users of a metadata repository to designate and use desired and correct data sources, which may therefore by considered authoritative, locally and across an enterprise. Although specific embodiments have been illustrated and described herein, those of ordinary skill in the art appreciate that any arrangement which is calculated to achieve the same purpose may be substituted for the specific embodiments shown and that there are other applications in other environments and adaptations or variations. The following claims are in no way intended to limit the scope of the appended claims to the specific embodiments described herein.

What is claimed is:

1. A method of designating authoritative sourcing of data in a data environment stored in at least one computer readable storage medium by creating a provisioning registry of the data, the provisioning registry comprising a registry data subject area, the method comprising:
    creating a provisioning strategy comprising:
        determining what information is of interest to potential data customers;
        determining what candidate systems of record and systems of collection are available for use;
        identifying limitations of interest for defining an operating scope for content of interest;
    receiving data of interest in the data environment, the data of interest comprising first data and second data corresponding to content stored in a content data subject area of the data environment;
    wherein the first data comprises description data defining the content based on a common business language stored in a common business language data subject area, and wherein the second data comprises a location identifier corresponding to the first data, the location identifier identifying a content location in the content data subject area of the data environment based on technical metadata stored in a metadata data subject area; and
    storing the first data and the second data in the registry data subject area;
    linking the first data with the second data;
    determining whether additional content of interest should be provisioned;
    in response to determining that additional content of interest should be provisioned,
    receiving corresponding additional data of interest; and
    in response to determining that no additional content of interest should be provisioned, reviewing the registry data subject area for errors;
    in response to identifying an error, correcting the error; and
    designating the provisioning registry is authoritative.

2. The method of claim 1, wherein the common business language data subject area, metadata data subject area, and registry data subject areas are tables stored in a data store.

3. The method of claim 1, wherein the common business language data subject area, metadata data subject area, and registry data subject areas are each data stores.

4. The method of claim 1, further comprising receiving data of interest in the data environment, the data of interest further comprising third data corresponding to content stored in the content data subject area of the data environment;
    wherein the third data comprises designation process status data representing whether the location identifier identifies the content location as a candidate for being an authoritative source or has been approved as an authoritative source by a data governance entity; and
    linking the third data with the first data or the second data.

5. The method of claim 1, further comprising:
    receiving fourth data in the data environment, the fourth data comprising a basis of authority of the data location selected from one of a system of record, a system of collection, or an approved provisioning point; and
    storing the fourth data in the registry data subject area.

6. The method of claim 1, further comprising receiving into the registry data subject area an operating scope of the location identifier.

7. The method of claim 5, wherein the operating scope is at least one of functional, geographic, temporal, or organizational.

8. A computer readable memory system comprising a processor and encoded with a non-transient data structure for designating authoritative sourcing of data in a data environment, the data structure comprising:
    a common business language data subject area for storing a common business language for defining content of interest;
    a metadata data subject area for storing technical metadata comprising location metadata for identifying a location of the content of interest;
    a provisioning registry based, at least in part, on a provisioning strategy created by determining what information is of interest to potential data customers, determining what candidate systems of record and systems of collection are available for use, and identifying limitations of interest for defining an operating scope for content of interest, the provisioning registry comprising a registry data subject area for:
    receiving data of interest corresponding to the content of interest, wherein the data of interest comprises description data defining the content based on the common business language and a location identifier identifying a content location in a content data subject area of the data environment based on the location metadata,
    storing the description data and the location identifier,
    linking the description data and the location identifier,
    in response to a determination that additional content of interest should be provisioned, receiving additional data of interest; and
    wherein the processor is for:

in response to a determination that no additional content of interest should be provisioned, initiating presentation of the provisioning registry for consideration for authoritative designation.

9. The computer readable memory system of claim 8, wherein the technical metadata includes the operational status of the content data subject area, the structure of the content data subject area, characteristics of the content of interest, or combinations thereof.

10. The computer readable memory system of claim 8, wherein the common business language data subject area, metadata data subject area, and registry data subject areas are tables stored in a data store.

11. The computer readable memory system of claim 8, wherein the common business language data subject area, metadata data subject area, and registry data subject areas are each data stores.

12. The computer readable memory system of claim 8, wherein the registry data subject area is further for receiving and storing a designated provisioning role for the content location identified by the location identifier.

13. The computer readable memory system of claim 8, wherein the registry data subject area is further for receiving and storing an operating scope of the data of interest.

14. The computer readable memory system of claim 13, wherein the operating scope is functional, geographic, temporal, organizational, or a combination thereof.

15. A method of using a data registry stored in a computer readable storage medium operatively connected to a processor to obtain direction on appropriate data sourcing from a data environment using a provisioning registry based, at least in part, on a provisioning strategy created by determining what information is of interest to potential data customers, determining what candidate systems of record and systems of collection are available for use, and identifying limitations of interest for defining an operating scope for content of interest, the method comprising:
   identifying data of interest associated with a common business language description;
   reviewing, by the processor, the provisioning registry to determine whether the common business language description associated with the data of interest is stored therein;
   in response to determining the common business language description associated with the data of interest is not stored in the provisioning registry, seeking to supplement the registry;
   in response to determining the common business language description associated with the data of interest is stored in the provisioning registry, determining, by the processor, whether a location of the data of interest is authoritative; and
   in response to determining the location of the data of interest is authoritative, initiating, by the processor, accessing the data of interest.

16. The method of claim 15, wherein the authoritative location of the data of interest is approved by a registry governance entity.

17. The method of claim 15, further comprising:
   in response to determining the location of the data of interest is not authoritative, obtaining permission to use the location of the data of interest for accessing the data of interest from a registry governance entity.

18. The method of claim 15, further comprising:
   in response to determining the location of the data of interest is not authoritative, obtaining approval for accessing the data of interest from a second location of the data of interest determined to be authoritative from a registry governance entity.

19. A computer program product for designating authoritative sourcing of data in a data environment, the computer program product including a non-transitory computer readable storage medium having a computer program stored therein, the computer program comprising:
   instructions for receiving data of interest in the data environment, the data of interest comprising first data and second data corresponding to content stored in a content data subject area of the data environment;
   wherein the first data comprises description data defining the content based on a common business language stored in a common business language data subject area, and wherein the second data comprises a location identifier corresponding to the first data, the location identifier identifying a content location in the content data subject area of the data environment based on technical metadata stored in a metadata data subject area; and
   instructions for storing the first data and the second data in a registry data subject area of a provisioning registry based, at least in part, on a provisioning strategy created by determining what information is of interest to potential data customers, determining what candidate systems of record and systems of collection are available for use, and identifying limitations of interest for defining an operating scope for content of interest;
   instructions for linking the first data with the second data;
   instructions for determining whether additional content of interest should be provisioned;
   instructions for, in response to determining that additional content of interest should be provisioned, receiving corresponding additional data of interest; and
   instructions for, in response to determining that no additional content of interest should be provisioned, reviewing the registry data subject area for errors;
   instructions for, in response to identifying an error, correcting the error; and
   instructions for initiating presentation of the provisioning registry for consideration for authoritative designation.

20. The computer program product of claim 19, further comprising:
   instructions for receiving data of interest in the data environment, the data of interest further comprising third data corresponding to content stored in the content data subject area of the data environment;
   wherein the third data comprises designation process status data representing whether the location identifier identifies the content location as a candidate for being an authoritative source or has been approved as an authoritative source by a data governance entity; and
   instructions for linking the third data with the first data or the second data.

21. The computer program product of claim 19, further comprising instructions for receiving into the registry data subject area an operating scope of the location identifier.

22. An apparatus configured to designate authoritative sourcing of data in a data environment, the apparatus comprising:
   a computer readable storage medium including computer readable program code stored therein;
   a processor operatively coupled to the computer readable storage medium and configured to execute the computer readable program code to:

receive data of interest in the data environment, the data of interest comprising first data and second data corresponding to content stored in a content data subject area of the data environment;

wherein the first data comprises description data defining the content based on a common business language stored in a common business language data subject area, and wherein the second data comprises a location identifier corresponding to the first data, the location identifier identifying a content location in the content data subject area of the data environment based on technical metadata stored in a metadata data subject area; and store the first data and the second data in a registry data subject area of a provisioning registry based, at least in part, on a provisioning strategy created by determining what information is of interest to potential data customers, determining what candidate systems of record and systems of collection are available for use, and identifying limitations of interest for defining an operating scope for content of interest;

link the first data with the second data;

initiate determining whether additional content of interest should be provisioned;

in response to determining that additional content of interest should be provisioned, receive corresponding additional data of interest; and in response to determining that no additional content of interest should be provisioned, initiate review of the registry data subject area for errors;

in response to identifying an error, initiate correction of correct the error;

and initiate presentation of the provisioning registry for consideration for authoritative designation.

* * * * *